United States Patent [19]

Erickson et al.

[11] 4,304,410
[45] Dec. 8, 1981

[54] SEALING STRUCTURE FOR RECIPROCATING PISTONS EXPOSED TO HIGH PRESSURE DIFFERENTIALS

[75] Inventors: John W. Erickson, Huntington Beach; Harold L. Petrie, Sieria Madre; F. Barton Brown, La Crescenta; Herbert L. Johnson, Los Angeles, all of Calif.

[73] Assignee: Kobe, Inc., Commerce, Calif.

[21] Appl. No.: 77,449

[22] Filed: Sep. 20, 1979

[51] Int. Cl.³ .................... F16J 1/08; F16J 15/44
[52] U.S. Cl. .................... 277/53; 277/208; 277/214; 277/215; 92/158; 92/162 R
[58] Field of Search ............ 92/159, 162 R, 158, 92/162 P; 277/12, 53, 96.1, 134, 133, 135, 214, 215, 207 R, 208

[56] References Cited

U.S. PATENT DOCUMENTS

| | | | |
|---|---|---|---|
| 17,855 | 7/1875 | Gale | 92/162 R X |
| 1,233,438 | 7/1917 | Barengueras | 92/162 X |
| 1,360,498 | 11/1920 | Chandlee | 92/158 |
| 1,953,171 | 4/1934 | Griffiths | 92/162 X |
| 2,291,243 | 7/1942 | Levy | 92/162 R |
| 2,860,896 | 11/1958 | Naumann | 277/134 |
| 2,878,990 | 3/1959 | Zurcher | 92/162 R X |
| 3,035,879 | 5/1962 | Hanny et al. | 92/162 R X |
| 3,653,303 | 4/1972 | Zurcher | 92/162 |
| 3,659,504 | 5/1972 | Zurcher | 92/162 |
| 3,721,163 | 3/1973 | Hill et al. | 92/158 |
| 3,818,805 | 6/1974 | Johansson | 92/162 X |
| 4,135,723 | 1/1979 | Urquhart | 92/162 R X |
| 4,197,786 | 4/1980 | Pillow | 92/162 R X |

FOREIGN PATENT DOCUMENTS

| | | | |
|---|---|---|---|
| 919679 | 11/1954 | Fed. Rep. of Germany | 92/162 R |
| 202316 | 9/1924 | United Kingdom | 92/162 R |
| 472999 | 10/1937 | United Kingdom | 92/162 R |
| 751297 | 6/1956 | United Kingdom | 277/53 |

*Primary Examiner*—Robert S. Ward, Jr.
*Attorney, Agent, or Firm*—William C. Norvell, Jr.

[57] ABSTRACT

This invention effects a significant reduction in leakage along a piston reciprocating in a cylinder and having a high fluid pressure differential existing between one end of the piston and the other. A large number of closely spaced, annular grooves are provided on the periphery of the piston and the clearance between the non-grooved piston diameter and the interior wall of the cylinder is maintained at a value significantly larger than that commonly employed between a smooth cylindrical shaft and a cylindrical interior sealing surface. The employment of such unexpectedly large clearance not only provides reduced fluid leakage for lighter density fluids when the equipment is relatively new, but the leakage becomes substantially less than that encountered in a smooth surface bearing construction as the piston and cylinder surfaces wear and increase the clearance.

2 Claims, 6 Drawing Figures

SEALING STRUCTURE FOR RECIPROCATING PISTONS EXPOSED TO HIGH PRESSURE DIFFERENTIALS

BACKGROUND OF THE INVENTION

1. Field of the Invention

This invention relates to an improved fluid seal between a reciprocating piston sliding in a cylindrical bore, wherein a significant pressure differential, on the order of at least three thousand pounds per square inch exists across the opposite ends of the piston. Such fluid seals are required, for example, to journal the reciprocating piston elements of a high pressure reciprocating pump.

2. Description of the Prior Art

Reciprocating pumps have been commonly employed in the oil processing industry to develop fluid pressures in excess of three thousand pounds per square inch. In many oil field pumping applications, the fluid comprises a mixture of oil with water and other low viscosity fluids so that the viscosity of the mixed fluid to be pumped is significantly less than that of oil. The reciprocating pumps heretofore employed for such applications have utilized a piston element of relatively small diameter moving in a cylindrical chamber. Because of the relatively high viscosity of the oil, it has been common heretofore to employ smooth, precisely finished cylindrical surfaces on both the piston and the piston chamber to achieve a very limited mechanical clearance between such surfaces to effectively reduce any leakage of the fluid by providing only a limited clearance laminar flow path for the pressured fluid. While such configurations were satisfactory for relatively low pressure pumps and high viscosity fluids, the technical demands of modern oil processing equipment require higher pressures to be developed, and mixed fluids of significantly lower viscosity, and even water alone, to be handled by the pressure generating pump. This has resulted in increased leakage of the fluid through the laminar flow seals normally provided around the pistons of high pressure pumps to a degree as to significantly reduce the efficiencies of such pumps in modern oil processing applications.

SUMMARY OF THE INVENTION

The invention provides an improved seal construction between a cylindrical bore and a cylindrical piston reciprocating in such bore where a large pressure differential exists across the two ends of the bore. Instead of finishing the cylinder bore wall and the piston diameter to the highest degree of precision possible, to produce a minimal clearance between such components, this invention contemplates employing a significantly greater clearance between the exterior of the piston and the interior of the cylinder chamber and, at the same time, causing any fluid passing through such increased clearance to flow in a series of turbulent paths such as produced by the formation of a large number of closely spaced annular grooves in the surface of either the piston or bore.

For any particular piston and cylinder bore configuration, the invention contemplates plotting two curves respectively representing the fluid leakage along the piston produced by a laminar flow between the piston and bore surfaces and the leakage produced by the turbulent flow of fluid through a large number of closely spaced annular grooves provided on either the piston or bore surface, each as a function of the clearance between the maximum diameter of the piston and the internal diameter of the bore. Such curves will be found to intersect at a relatively low clearance value and thereafter rapidly diverge as the clearance values become significantly higher than that which would normally be employed in a laminar flow configuration. Hence the minimum clearance for a seal embodying the turbulent leakage flow paths of this invention is normally required to be well in excess of the crossover point indicated by the aforementioned curves.

Further objects and advantages of the invention will be apparent to those skilled in the art from the following detailed description, taken in conjunction with the annexed sheet of drawings.

DESCRIPTION OF THE PREFERRED EMBODIMENTS

Figure 1:
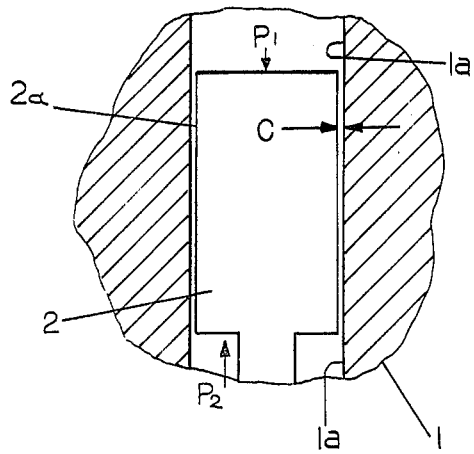
FIG. 1 is a schematic view of a conventional shaft type piston for a high pressure reciprocating pump cooperating with a cylinder bore wherein the leakage of fluid along the piston due to the high pressure differential is controlled solely by reducing the clearance for the laminar fluid flow to a minimum.

Referring to FIG. 1, the numeral 1 schematically indicates a cylinder 1 having a highly accurate cylindrical bore 1a within which a cylindrical piston 2 is mounted for reciprocating movements. The top portions of the piston 2 are exposed to a relatively high pressure $P_1$ on the order of three thousand pounds per square inch or greater, while commonly, the lower end of the piston 2 is exposed to a lower or atmospheric pressure $P_2$, so that there is a significant pressure differential, $P_1 - P_2$, along the length of the cylindrical sealing surface 1a. Those skilled in the art will recognize that the problem is to maintain the leakage of the high pressure fluid between the clearance C existing between the bore wall 1a and the piston-shaft wall 2a at a minimum value while at the same time avoiding any binding of the piston shaft 2 within the walls of bore 1a. It follows that extremely small diametral (2C) clearances on the order of 0.0006 inches per inch of diameter are commonly employed in such applications.

When the pressure differential is increased, say to a level of five thousand PSI, and concurrently the viscosity of the fluid to which the cylinder 1 and piston 2 are exposed is significantly reduced, it has been observed that the fluid leakage, even by laminar flow through diametral clearances on the order of 0.0004 inches or less, becomes quite significant and adversely affects the performance of the pump.

Figure 2:
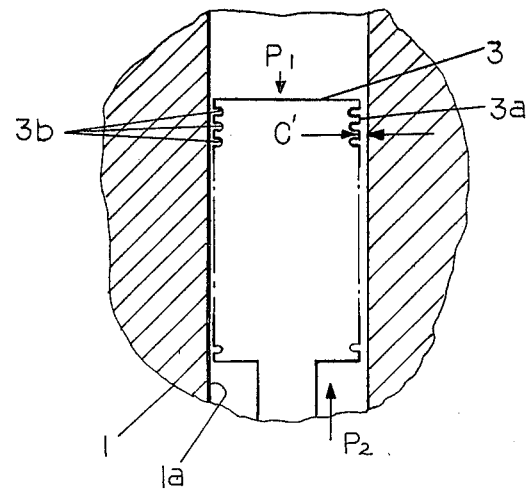
FIG. 2 is a schematic view illustrating a piston seal constructed in accordance with this invention to provide a turbulent flow path for leakage fluid along the length of the piston.
Figure 3:
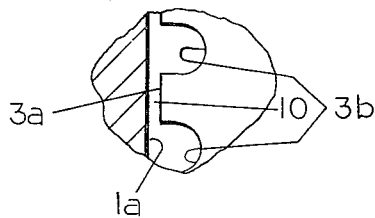
FIG. 3 is a greatly enlarged view of a portion of FIG. 2.

The increased leakage encountered with the conventional seal configuration of FIG. 1 is overcome through the utilization of the seal configuration embodying this invention illustrated in FIG. 2. Again, the numeral 1 represents a cylinder or seal having an accurately finished cylindrical bore surface 1a within which a piston or shaft 3 reciprocates. In accordance with this invention, the minimum clearance C' between the exterior surface of 3a of piston or shaft 3 is significantly increased over that existing in the prior art construction of FIG. 1. For example, the diametral clearance 2C' could be on the order of 0.0008 inches. Additionally, a plurality of closely spaced annular grooves 3b are formed in the piston surface 3a. While the exact number of such grooves is not critical, a large number of such grooves on the order of fifty to one hundred are preferably employed. The depths of the grooves is not critical, but they should be sufficiently deep so that they produce a turbulent flow path for any fluid passing down between the piston surface 3a and the cylinder surface 1a. In effect, the fluid flow path is now defined by a plurality of orifices 10 (see FIG. 3) which are defined between each maximum diameter band of piston surface 3a and the bore surface 1a, which orifices connect between larger volume chambers defined by the annular grooves 3b. I have discovered that the pressure drop across each successive orifice 10 is a linear function of the number of such orifices, hence if there are one hundred grooves 3b in piston surface 3a, the pressure differential across each successive orifice defined by the maximum diameter ungrooved portions of the piston surface 3a will be approximately one hundredth of the total pressure differential existing across the length of the seal or piston 3. Reducing the pressure drop reduces the leakage flow.

To determine the clearance C' to be employed in the seal construction embodying this invention for any specfic pump, two curves are constructed for a particular dimensional configuration of the cylinder bore and cooperating piston or shaft. The desired total pressure differential is known and the viscosity of the pressured fluid applied to the seal is determined by measurement or by assumption.

Figure 4:
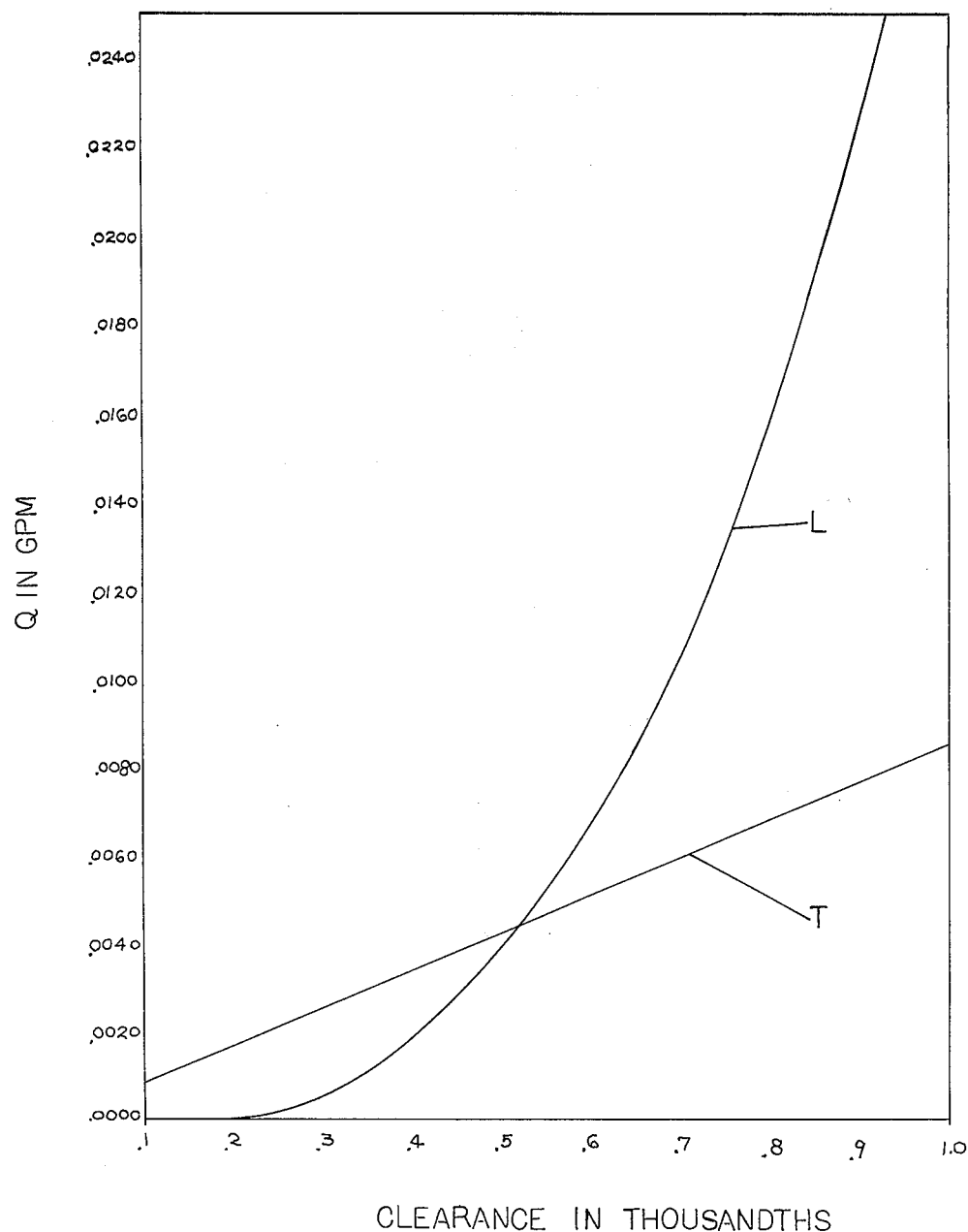
FIG. 4 is a graph showing fluid leakage curves for a conventional seal and a seal embodying this invention as a function of the minimum clearance.

The fluid leakage $Q_L$ is then computed for the laminar flow sealing condition employed in the configuration of FIG. 1. As is well known, the leakage flow $Q_L$ is defined by the following equation:

$$Q_L = \frac{\pi}{6} \times \frac{DC^3 P}{16L\mu}$$

where $Q_L$ equals leakage flow, D equals the piston diameter, C equals the diametral clearance, P equals change in pressure along the leakage path, L equals length of leakage path and $\mu$ equals absolute fluid viscosity. For a particular seal configuration and application, the leakage is then computed as a function of the clearance C and a curve such as the curve L shown in FIG. 4 is obtained which plots the leakage flow in GPM versus diametral clearance C in tenths of a thousandth inches.

Using the identical cylinder diameter, length of seal, pressure differential, and density of fluid applied to the seal, a calculation is then made of the fluid leakage that would be encountered through the turbulent leakage flow produced by the seal construction of FIG. 2. Through the application of known formulas for fluid flow through an orifice across which a pressure differential exists, the leakage flow $Q_T$ is expressed in the following equation:

$$Q_T = \frac{DC(\Delta P)^{\frac{1}{2}}}{(2Ke)^{\frac{1}{2}}}$$

where $Q_T$ is the turbulent flow rate, $\Delta P$ equals the pressure differential across each of the successive orifices, C is the minimal diametral clearance between the ungrooved piston walls 3a and the interior wall 1a of the cylinder, D is the maximum diameter of the piston, K is the orifice coefficient, which is an imperically determinable number and E equals fluid density.

This fluid leakage is then plotted in terms of gallons per minute as a function of the diametral clearance between the maximum diameter piston-shaft surface 3a and the bore surface 1a, resulting in the curve T shown in FIG. 4.

It will be noted that in this particular example, the curve L provides less leakage than the curve T for clearances of less than 0.0005 inches. Above that clearance level, the leakage loss by laminar flow through larger clearances greatly exceeds the loss produced by the turbulent flow represented by the curve T.

The curves plotted in FIG. 4 were based on the dimensions of a piston plunger in a specific commercial high pressure pump known as the Kobe Size 3-5k Triplex Pump which is marketed by Kobe, Inc. of Huntington Park, California. The curves demonstrate convincingly that for diametrical clearances large enough to result in economic manufacture of the piston and cylinder bore, a seal construction embodying this invention will provide significantly reduced fluid leakage when subjected to pressure differentials on the order or three thousand PSI or greater. The same principle will be found to exist for any other type of reciprocating piston wherein it is desired to minimize the fluid leakage due to a fluid pressure differential along the length of a piston.

It follows that in the design of any specific seal, the construction of the curves T and L from the above listed equations will locate the crossover point of the curves at a particular clearance measured in ten thousandths of an inch. The design of the seal construction of FIG. 2 should then be made with diametral clearance 2C' equal to or slightly exceeding the crossover point clearance indicated by the curves L and T. This will insure that the initial fluid leakage through the seal of FIG. 2 will be no greater than that encountered in the laminar leakage seal construction of FIG. 1, but, more importantly, as the surfaces of the piston and cylinder wear, which they inevitably will, the leakage due to the increased clearance provided by wear will be significantly less with the construction of this invention than that produced by a conventional laminar flow leakage path.

Since there is no significant reduction of leakage flow to be derived by constructing the sealing arrangement of this invention with an excessively small clearance, manufacturing economy dictates that as large as possible clearance value be selected which will not make the performance of the resulting pump any less desirable from a leakage standpoint than that provided by a laminar flow sealing arrangement having approximately the same minimum clearance.

Of equal importance is the fact that the leakage through the turbulent flow construction provided by this invention will not be increased to the same degree by a change in viscosity and/or density of the fluid passing through the seal. The amount of leakage in the laminar leakage path configuration of FIG. 1 is inversely proportional to the viscosity of the fluid. It therefore follows that the more water that is incorporated in the fluid, the greater will be the leakage. In contrast, the leakage for the turbulent flow path provided by the construction of this invention is inversely proportional to the square root of the density of the fluid. It is well known that the changes in density of mixed fluids required to be pumped in oil fields are significantly less than the changes in viscosity of such mixed fluids. It follows that the seal construction embodying this invention will provide improved performance for mixed fluids, particularly when the effect of the mix is to significantly reduce the viscosity of the mixed fluid.

Lastly, there is the recognized advantage of the seal construction embodying this invention in that the provision of the annular channels 3b around the piston 3 is known to have the effect of centering the piston 3 within the diameter of the cylindrical seal surface 1a. Significantly greater leakage is always produced when the shaft or piston may assume an off-center position with respect to the surrounding cylindrical surface of the bore.

Figure 5:
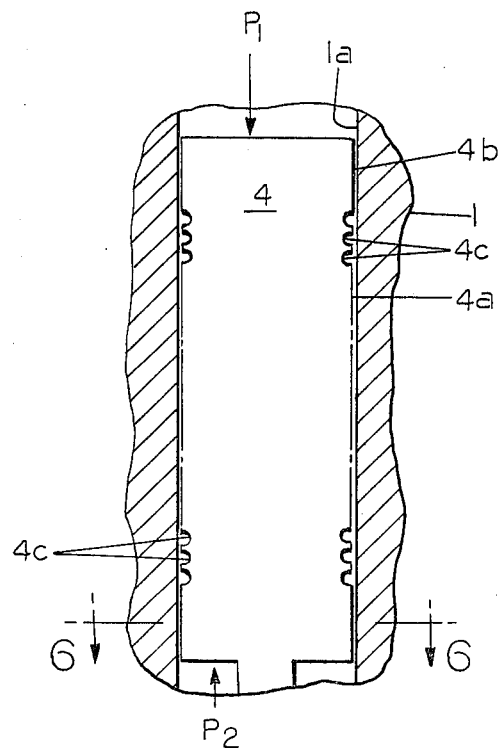
FIG. 5 is a view similar to FIG. 1 of a modified piston seal embodying this invention.
Figure 6:
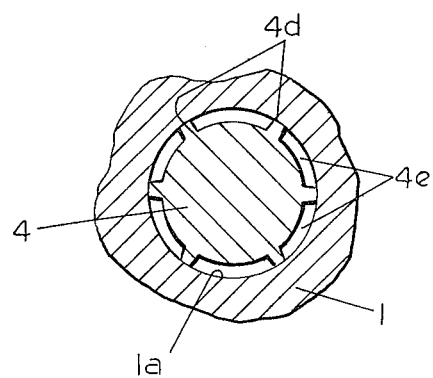
FIG. 6 is a sectional view taken on the plane 6—6 of FIG. 5.

Referring now to FIGS. 5 and 6, there is shown a modification of this invention which is particularly useful in the event that the fluid to be pumped contains a significant amount of particulate. Again, a cylinder 1 is provided having a precisely ground cylindrical bore 1a. The piston 4 is provided with a medial portion 4a and two identical end portions 4b. Each end portion 4b is provided with a plurality of peripherally spaced, axially extending grooves or recesses 4e, thus defining between such recesses a relatively narrow bearing segment land 4d. The medial portion 4a of piston 4 is provided with a plurality of closely spaced annular grooves 4c constructed in the same manner as the grooves 3b in the previously described modification. In other words, for a pressure differential across the ends of the piston 4, in excess of 3,000 psi, a minimum of 50 such annular grooves, and preferably a total of about 100 such grooves are provided. The initial diametral clearance between the maximum diameter portions of the piston 4 and the adjacent cylindrical bore surface 1a is determined in the same manner as described in connection with the previous modification. The provisions of the axial lands 4d permits the entry of particulate matter into the space between the piston 4 and the cylinder bore 1a without causing a scoring of the precisely ground cylindrical surfaces of such elements.

Although the invention has been described in terms of specific embodiments which have been set forth in detail, it should be understood that this is for illustration only and that the invention is not necessarily limited thereto. Accordingly, modifications are contemplated which can be made without departing from the spirit of the described invention. For example, the grooves 3a could be formed in the cylinder bore 1a to produce an equivalent turbulent flow path for fluid leakage.

What is claimed and desired to be secured by Letters Patent is:

1. A high pressure fluid seal for a piston element having a cylindrical exterior surface reciprocatingly mounted in a cylindrical bore having a cylindrical interior surface and exposed to fluids of varying densities and viscosities and a fluid pressure differential in excess of 3000 psi, comprising a plurality of closely spaced, annular grooves provided in one of said cylindrical surfaces and constructed and arranged to cause high pressure fluid leaking between such surfaces to flow in a turbulent manner in said grooves, the total number of said grooves being at least 50 and the diametral clearance between the ungrooved portions of said cylindrical surfaces being about 0.0008 inches.

2. A high pressure fluid seal for a piston element having an external cylindrical surface reciprocatingly mounted in a cylindrical bore having an internal cylindrical surface and exposed to a high fluid pressure at one end of the bore, comprising: at least fifty closely spaced, annular grooves provided in one of said cylindrical surfaces and constructed and arranged to cause high pressure fluid leaking between such surfaces to flow in a turbulent manner in said grooves, the minimum clearance between the maximum diameter of said piston cylindrical surface and the minimum diameter of said cylindrical bore surface being selected to be not less than the value at which the following relationship exists:

$$\frac{\pi}{6} \times \frac{DC^3P}{16L\mu} = \frac{DC(\Delta P)^{\frac{1}{2}}}{(2Ke)^{\frac{1}{2}}}$$

where D is the piston diameter, C is the minimum diametrical clearance, P is the change in pressure along the seal length, L is the length of the seal, $\mu$ is the absolute fluid viscosity, $\Delta P$ is the pressure differential between each of the successive grooves, E is the fluid density, and K is an orifice constant.

* * * * *